Dec. 27, 1966 J. T. KARBOSKY ETAL 3,293,869
GAS LIQUEFACTION WITH RECOMBINING OF SEPARATED
GAS-LIQUID FRACTIONS
Filed Feb. 10, 1964
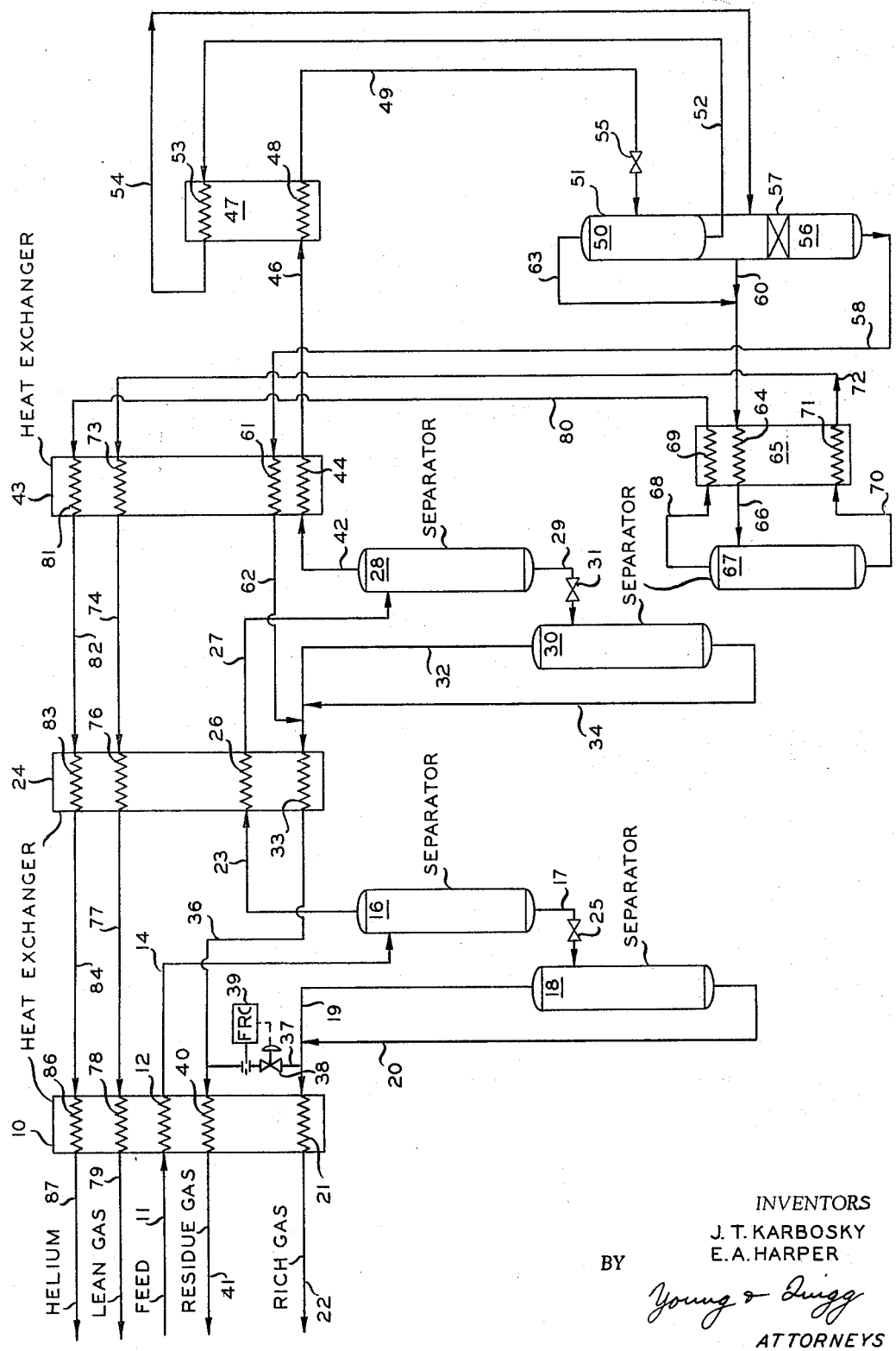
INVENTORS
J. T. KARBOSKY
E. A. HARPER
BY
Young & Quigg
ATTORNEYS United States Patent Office 3,293,869
Patented Dec. 27, 1966

3,293,869
GAS LIQUEFACTION WITH RECOMBINING OF SEPARATED GAS-LIQUID FRACTIONS
Joseph T. Karbosky and Ernest A. Harper, Bartlesville, Okla., assignors to Phillips Petroleum Company, a corporation of Delaware
Filed Feb. 10, 1964, Ser. No. 343,688
6 Claims. (Cl. 62—23)

This invention relates to a method and apparatus for the indirect exchange of heat between at least three fluid streams. In another aspect, this invention relates to an improved helium recovery process and apparatus therefor.

In the recovery of helium from natural gas by the condensation and separation of the hydrocarbon constituents from the natural gas feed, the effectiveness of the helium recovery process is highly dependent upon the efficiency of the heat transfer steps. Therefore, any improvement in the heat transfer steps will result in a substantial improvement of the helium recovery process.

Accordingly, an object of our invention is to provide an improved method and apparatus for the transfer of heat between at least three fluid streams.

Another object of our invention is to provide an improved method and apparatus for the indirect transfer of heat between at least three fluid streams wherein at least one of said fluid streams is a liquid and is at least partially vaporized during the heat exchange step.

Another object of our invention is to provide an improved helium recovery process and apparatus therefor.

Other objects, advantages and features of our invention will be readily apparent to those skilled in the art from the following description, the drawing and appended claims.

We have discovered that wherein a fluid is cooled by indirect heat exchange with a vapor and liquid that is at least partially vaporized during the heat exchange step, improved heat exchange is effected by combining a portion of the said vapor with the said liquid prior to the heat exchange step, said vapor having a greater volatility than said liquid. Although not to be limited thereto, the invention is particularly applicable to the recovery of helium from natural gas and the invention will hereinafter be described as particularly applied to the helium recovery process.

The drawing is a schematic representation of one embodiment of the inventive process and apparatus therefor.

Referring to the drawing, a natural gas feed comprising helium, nitrogen and $C_1$ to $C_5$ hydrocarbons is passed through conduit means 11 into and through flow path 12 of heat exchanger 10 wherein the feed gas is substantially cooled as hereinafter and more fully described. The partially condensed feed is passed through conduit 14 into liquid-gas separator 16. A liquid comprising predominantly $C_1$ to $C_5$ hydrocarbons with a small amount of nitrogen is withdrawn from separator 16 via conduit means 17.

The liquid withdrawn from separator 16 via conduit means 17 is subjected to a pressure reduction-flash vaporization step by passing the liquid through valve means 25 and into separator 18. A vapor at a reduced temperature and pressure is withdrawn from separator 18 via conduit means 19 and passed to heat exchanger 10. A liquid at a reduced temperature and pressure is withdrawn from separator 18 via conduit means 20, and in combination with the vapor passing through conduit means 19, passed to heat exchanger 10. The vapor-liquid mixture in combination with another vaporous stream, hereinafter described, is passed through heat exchanger 10 by means of flow path 21 in indirect heat exchange with the feed flowing through heat exchanger 10 via flow path 12 and other fluids flowing through heat exchanger 10. The liquid within flow path 21 is vaporized within heat exchanger 10 and rich gas is withdrawn from heat exchanger 10 via conduit means 22. This rich gas withdrawn via conduit means 22 can be passed to natural gasoline recovery absorption and stabilizing steps whereby a natural gasoline product is obtained.

Vapors, which comprise substantially all of the helium and a major portion of the nitrogen contained in the feed gas stream, with the remainder being primarily $C_1$ hydrocarbons with a small quantity of $C_2$ to $C_5$ hydrocarbons, are withdrawn from separator 16 via conduit means 23 and passed through heat exchanger 24 via flow path 26. The vapor is partially condensed within heat exchanger 24 and a vapor-liquid mixture passed via conduit means 27 to liquid-vapor separator 28. A liquid, which is primarily $C_1$ hydrocarbons together with substantially all of the $C_2$ to $C_5$ hydrocarbons passing through conduit 27, with a minor portion of the nitrogen, is withdrawn from separator 28 via conduit means 29 and subjected to a pressure reduction-flash vaporization step by passage via valve means 31 to separator 30 maintained at a substantially lower pressure.

Vapors are withdrawn from separator 30 via conduit means 32. Liquid is withdrawn from separator 30 via conduit means 34, combined with the vapor passing through conduit 32 and a vapor-liquid mixture passed through heat exchanger 24 via flow path 33. The vapor-liquid mixture passed through heat exchanger 24 via flow path 33 is in indirect heat relationship with a fluid flowing through flow path 26 and other fluids flowing through heat exchanger 24, cooling the fluid flowing through flow path 26 and vaporizing the liquid in the vapor-liquid mixture flowing through flow path 33.

A vapor is withdrawn from heat exchanger 24 via conduit means 36 and a portion of the vapor passed through heat exchanger 10 via flow path 40. The remainder of the vapor withdrawn from heat exchanger 24 via conduit means 36 is passed via conduit means 37 and valve means 38 to conduit means 19 wherein the vapor is combined with the vapor-liquid mixture flowing through conduit means 19 to heat exchanger 10. The rate of flow of vapor through conduit means 37 is controlled by a conventional flow recorder-controller 39 opening and closing valve 38 responsive to a rate of flow measurement in conduit 37 and a set point representative of a desired rate of vapor flow through conduit 37. A residue gas suitable as a fuel gas is withdrawn from heat exchanger 10 via conduit means 41.

It has been discovered that by combining a portion of the vapor flowing through conduit 36 with the vapor-liquid mixture flowing through conduit 19 that increased heat exchange is effected in heat exchanger 10. Thus, a product feed vapor-liquid mixture at a desirably lower temperature is obtained in conduit 14 than would be possible if a portion of the gas in conduit 36 was not combined wth the vapor-liquid mixture withdrawn from separator 18. By passing a portion of the residue gas having a lower molecular weight (greater volatility) than the liquid in conduit 19 to conduit 19 in the described manner, vaporization of the liquid in flow path 21 is effected more rapidly and at a lower temperature within flow path 21, producing a greater ΔT within heat exchanger 10.

A vapor, comprising primarily helium, nitrogen and $C_1$ hydrocarbons, is withdrawn from separator 28 via conduit 42 and passed through heat exchanger 43 via flow path 44 wherein the said vapor is cooled. Cooled fluid is withdrawn from heat exchanger 43 via conduit means 46 and passed through heat exchanger 47 via flow path 48 wherein the fluid is further cooled. A liquid-vapor mixture is withdrawn from heat exchanger 47 via conduit means 49 and subjected to a pressure reduction-flash vaporization step by passing the mixture through valve means 55 and into chamber 50 of column 51.

Chamber 50 also acts as a vapor-liquid separator. The liquid is withdrawn from chamber 50 via conduit means 52 and passed through flow path 53 in indirect heat exchange with the fluid flowing through flow path 48. A slightly heated fluid is withdrawn from heat exchanger 47 via conduit means 54 and passed to the upper region of chamber 56 of column 51. A stripping element 57 is positioned in chamber 56 below the entry therein of conduit 54 to provide for greater separation of the gas phase from the liquid phase. Element 57 can be any suitable material such as wire mesh, metal ball rings, saddles, and the like. Vapor-liquid contacting devices such as bubble cap and sieve trays can also be utilized for element 57.

Liquid is withdrawn from chamber 56 via conduit means 58 and passed through heat exchanger 43 via flow path 61 in indirect heat exchange with the fluid flowing through flow path 44 and other fluids flowing through heat exchanger 43. A heated fluid is withdrawn from heat exchanger 43 via conduit means 62 and combined with the vapor-liquid mixture flowing through conduit 32.

A vapor is withdrawn from chamber 50 via conduit means 63, combined with the vapors withdrawn from chamber 56 via conduit means 60 and the mixture passed via flow path 64 through heat exchanger 65 wherein the said vapor mixture is cooled. A cooled liquid-vapor mixture is withdrawn from heat exchanger 65 via conduit means 66 and passed to separator 67. Separator 67 is operated at a substantially lower pressure and the vapor-liquid mixture produced by the pressure reduction-flash vaporization step is separated into a liquid and gaseous phase within separator 67.

A liquid phase is withdrawn from the bottom of separator 67 via conduit means 70 and passed through heat exchange means 65 via flow path 71 in indirect heat exchange with a fluid flowing through flow path 64. Within heat exchanger 65 the liquid feed is vaporized and passed from heat exchanger 65 via conduit means 72 to heat exchanger 43. Lean gas which is substantially nitrogen and methane with a very small quantity of helium is passed through heat exchanger 43 via flow path means 73 in indirect heat exchange with fluids flowing through heat exchanger 43. Heated lean gas is withdrawn from heat exchanger 43 via conduit means 74 and passed through heat exchanger 24 via flow path means 76 in indirect heat exchange with the fluids flowing through heat exchanger 24. A further heated lean gas is withdrawn from heat exchanger 24 via conduit means 77 and passed through heat exchanger 10 via flow path 78 in indirect heat exchange with the feed material flowing through flow path 12 and other fluids flowing through heat exchanger 10. Lean gas, heated in heat exchanger 10, is withdrawn from heat exchanger 10 via conduit means 79.

A helium stream is withdrawn from the top of separator 67 via conduit means 68 and passed through heat exchanger 65 via flow path 69 in indirect heat exchange with fluids flowing through heat exchanger 65. A heated helium stream is withdrawn from heat exchanger 65 via conduit means 80 and passed through heat exchanger 43 via flow path 81 in indirect heat exchange with fluids flowing through heat exchanger 43. Helium, further heated in heat exchanger 43, is withdrawn from heat exchanger 43 via conduit means 82 and passed through heat exchanger 24 via flow path 83 in indirect heat exchange with fluids flowing through heat exchanger 24. Helium at a higher temperature is withdrawn from heat exchanger 24 via conduit means 84 and is further heated upon being passed through heat exchanger 10 via flow path 86 in indirect heat exchange with fluids flowing through heat exchanger 10. A helium product stream is withdrawn from heat exchanger 10 via conduit means 87.

As illustrative of the effectiveness of the invention, the results obtained when operating according to the invention (Run 1) is compared with the results obtained by a process wherein a portion of the residue gas is not combined with the vapor-liquid feed passed to heat exchanger 10 via conduit means 19 (Run 2). In each run, the natural gas feed was passed at the rate of 115 MM cubic feet per day and at a temperature of 81° F. and a pressure of 350 p.s.i.a via conduit means 11 to heat exchanger 10. The composition of the feed in each run was as follows:

|  | Mol percent |
| --- | --- |
| Nitrogen | 14.88 |
| Helium | 0.66 |
| $C_1$ | 70.33 |
| $C_2$ | 6.49 |
| $C_3$ | 4.67 |
| $C_4$ | 2.02 |
| $C_5+$ | 0.95 |
| Total | 100.00 |

The composition of the lean gas and helium gas streams passed to heat exchanger 10 and recovered therefrom is as follows:

TABLE I

|  | Mol Percent (Conduit 79) | Mol Percent (Conduit 87) |
| --- | --- | --- |
| Helium | 0.2 | 51.0 |
| Nitrogen | 66.3 | 47.0 |
| $C_1$ | 32.0 | 2.0 |
| $C_2$ | 1.5 |  |

The temperature of the lean gas to and withdrawn from heat exchanger 10 in both Runs 1 and 2 remained substantially the same at −78° F. and 60° F., respectively. The temperature of the helium stream to and withdrawn from heat exchanger 10 in both Runs 1 and 2 remained substantially the same at −73° F. and 74° F., respectively.

In Run 1, the temperature of the residue gas passed to heat exchanger 10 via conduit means 36 was −72° F. and in Run 2, the temperature of the residue gas passed to heat exchanger 10 was −67° F. In Run 1, the temperature of the rich gas passed to heat exchanger 10 via conduit means 19 was −112° F. and the temperature of the rich gas passed to heat exchanger 10 in Run 2 was −108° F. In both runs, the temperature of the residue gas exiting from heat exchanger 10 was substantially the same at 72° F. In both runs, the temperature of the rich gas exiting from heat exchanger 10 was 44° F.

In Run 1, the temperature of the natural gas feed withdrawn from heat exchanger 10 and passed to separator 16 was −62.5° F. The temperature of the natural gas feed withdrawn from heat exchanger 10 and passed to separator 16 in Run 2 was −58° F. It can thus readily be seen that by operating according to the process of this invention, a substantial increase in heat exchange was effected in heat exchanger 10 resulting in lowering the temperature of the natural gas feed 4.5° F.

An additional advantage of the invention is evident when comparing the quantity of $C_3$ hydrocarbons recovered in both runs. The following data clearly illustrates that by employing the invention a substantial increase of $C_3$ hydrocarbons are available for processing in a subsequent natural gas recovery process. The compositions of the rich and residue gas for both runs passed to and recovered from heat exchanger 10 is presented below in Table II.

TABLE II

|  | Run 1 (Mol Percent) | | Run 2 (Mol Percent) | |
| --- | --- | --- | --- | --- |
|  | Conduit 22 | Conduit 41 | Conduit 22 | Conduit 41 |
| Nitrogen | 5.15 | 11.0 | 1.0 | 10.9 |
| $C_1$ | 35.8 | 80.1 | 4.0 | 79.9 |
| $C_2$ | 10.95 | 6.60 | 15.0 | 6.5 |
| $C_3$ | 28.95 | 2.15 | 45.4 | 2.5 |
| $C_4$ | 18.1 | 0.2 | 32.9 | 0.2 |
| $C_5+$ | 0.1 |  | 1.7 |  |
| Total | 100.0 |  |  |  |

With a mol concentration of $C_3$ hydrocarbons of 45.4 in Run 2, the quantity of $C_3$ hydrocarbons was 70,200 gallons in 97,491 cubic feet per day of residue gas in conduit 41. Also in Run 2, with a concentration of $C_3$ hydrocarbons of 45.4 mol percent, 85,700 gallons per day of $C_3$ hydrocarbons is recovered in the rich gas flowing in conduit 22.

By operating according to the invention, the quantity of $C_3$ hydrocarbons in the rich gas recovered from heat exchanger 10 via conduit means 22 is increased to 99,524. This represents an increase of 13,825 gallons per day of $C_3$ hydrocarbons recovered in the rich gas. By comparing the yield figures for the residue gas and rich gas streams in Runs 1 and 2, it can readily be seen that by operating the helium recovery process according to the conventional conditions of Run 2, 19.7 mol percent of the residue gas stream must be combined with the rich gas stream to obtain a total gaseous stream containing 99,524 gallons per day of $C_3$ hydrocarbons. It can further readily be seen that by combining the residue gas and rich gas streams so as to recover the stated amount of $C_3$ hydrocarbons in a subsequent natural gasoline recovery process, undesirable constituents comprising nitrogen, $C_1$ and $C_2$ hydrocarbons would also be added to the feed to the natural gasoline recovery process. Therefore, an additional advantage of the invention is clearly evident in that additional $C_3$ hydrocarbons are recovered in a product stream (rich gas) which can readily be processed in a subsequent natural gasoline recovery process to recover the natural gasoline components, including $C_3$ hydrocarbons, therefrom.

As will be evident to those skilled in the art, various modifications of this invention can be made, or followed, in the light of the foregoing disclosure, without departing from the spirit or scope thereof.

We claim:

1. In a process which comprises passing a feed gas stream to a first indirect heat exchange zone to partially liquefy said feed gas stream in said first indirect heat exchange zone, passing the resulting vapor-liquid mixture from said first indirect heat exchange zone to a first separation zone, passing a first vaporous stream from said first separation zone to a second indirect heat exchange zone to partially liquefy said first vaporous stream, passing the resulting vapor-liquid mixture from said second indirect heat exchange zone to a second separation zone, withdrawing a second vaporous stream from said second separation zone, passing a liquid from said second separation zone to a first vaporization zone, withdrawing a vapor from said first vaporization zone, withdrawing a liquid from said first vaporization zone, passing said vapor and liquid withdrawn from said first vaporization zone in admixture through said second indirect heat exchange zone in indirect heat exchange with said first vaporous stream passed from said first separation zone to said second separation zone, vaporizing in said second indirect heat exchange zone said liquid contained in said vapor-liquid mixture passed to said second indirect heat exchange zone from said first vaporization zone, passing a portion of the resultant vapor from said second indirect heat exchange zone through said first indirect heat exchange zone in direct heat exchange with said feed gas stream, passing a liquid from said first separation zone to a second vaporization zone, withdrawing a vapor from said second vaporization zone, withdrawing a liquid from said second vaporization zone, combining said vapor and liquid withdrawn from said second vaporization zone and passing said combined liquid-vapor mixture withdrawn from said second vaporization zone in admixture with the remainder of said resultant vapor through said first indirect heat exchange zone in indirect heat exchange with said feed gas stream, and vaporizing within said first indirect heat exchange zone at least a portion of said liquid withdrawn from said second vaporization zone.

2. In a process which comprises passing a helium-containing natural gas to a first indirect heat exchange zone, passing a vapor-liquid helium-containing mixture from said first indirect heat exchange zone to a first separation zone, passing a vaporous helium-containing stream from said first separation zone to a second indirect heat exchange zone, passing a vapor-liquid helium-containing mixture from said second indirect heat exchange zone to a second separation zone, withdrawing a helium-containing stream from said second separation zone, passing a liquid from said second separation zone to a first vaporization zone, withdrawing a vapor from said first vaporization zone, withdrawing a liquid from said first vaporization zone, passing said vapor and liquid withdrawn from said first vaporization zone in admixture through said second indirect heat exchange zone in indirect heat exchange with said vaporous helium-containing stream passed from said first separation zone to said second separation zone, vaporizing in said second indirect heat exchange zone said liquid contained in said vapor-liquid mixture passed to said second indirect heat exchange zone from said first vaporization zone, passing a portion of the resultant vapor from said second indirect heat exchange zone through said first indirect heat exchange zone in indirect heat exchange with said helium-containing natural gas, passing a liquid from said first separation zone to a second vaporization zone, withdrawing a vapor from said second vaporization zone, withdrawing a liquid from said second vaporization zone, combining said vapor and liquid withdrawn from said second vaporization zone and passing said combined liquid-vapor mixture withdrawn from said second vaporization zone in admixture with the remainder of said resultant vapor through said first indirect heat exchange zone in indirect heat exchange with said helium-containing natural gas, and vaporizing within said first indirect heat exchange zone at least a portion of said liquid withdrawn from said second vaporization zone.

3. The process of claim 2 wherein said liquid passed from said second separation zone to a first vaporization zone comprises nitrogen, $C_1$ and heavier hydrocarbons, said liquid passed from said first separation zone to a second vaporization zone comprises $C_1$ and heavier hydrocarbons, and helium-containing stream withdrawn from said second separation zone comprises helium, nitrogen and $C_1$ hydrocarbons.

4. Apparatus comprising an indirect heat exchange means, first conduit means for passing a fluid through said heat exchange means, a first separation vessel, second conduit means communicating between the downstream end of said first conduit means and said first separation vessel, a second separation vessel, third conduit means communicating with the upper region of said first separation vessel, fourth conduit means communicating between the lower region of said first separation vessel and said second separation vessel, means for vaporizing by pressure reduction at least a portion of a liquid flowing through said fourth conduit means, fifth conduit means communicating with the lower region of said second separation vessel, sixth conduit means for passing a fluid through said heat exchange means in indirect heat exchange with a fluid flowing through said first conduit means, seventh conduit means communicating between the upper region of said second separation vessel and the upstream end of said sixth conduit means, eighth conduit means for passing a fluid through said heat exchange means in indirect heat exchange with a fluid flowing through said first conduit means, and ninth conduit means communicating between said eighth conduit means and said seventh conduit means upstream of said heat exchange means, said fifth conduit means communicating between said second separation vessel and said seventh conduit means.

5. The apparatus of claim 4 to include means for controlling the rate of fluid flow through said ninth conduit means.

6. Apparatus comprising a first indirect heat exchange means, first conduit means for passing a fluid through said first indirect heat exchange means, a first separation vessel, second conduit means communicating between said first conduit means and said first separation vessel, a second indirect heat exchange means, a second separation vessel, third conduit means communicating between the upper region of said first separation vessel and said second separation vessel, said third conduit means passing through said second heat exchange means, fourth conduit means communicating with the upper region of said second separation vessel, third separation vessel, fifth conduit means communicating between the lower region of said second separation vessel and said third separation vessel, means for vaporizing by pressure reduction at least a portion of a liquid flowing through said fifth conduit means, sixth conduit means for passing a fluid through said first heat exchange means in indirect heat exchange with a fluid passing through said first conduit means, seventh conduit means communicating between said third separation vessel and said sixth conduit means and passing through said second heat exchange means, eighth conduit means communicating between the lower region of said third separation vessel and said seventh conduit means, fourth separation vessel, ninth conduit means communicating between the lower region of said first separation vessel and said fourth separation vessel, means for vaporizing by pressure reduction at least a portion of a liquid flowing through said ninth conduit means, tenth conduit means for passing a fluid through said first heat exchange means in indirect heat exchange with a fluid flowing through said first conduit means, eleventh conduit means communicating between the upper region of said fourth separation vessel and said tenth conduit means, twelfth conduit means communicating between the lower region of said fourth separation vessel and said eleventh conduit means, and thirteenth conduit means communicating between said sixth and said eleventh conduit means upstream of said first heat exchange means.

References Cited by the Examiner
UNITED STATES PATENTS 3,158,010  11/1964  Kuerston.
3,212,277  10/1965  Harper et al. _____ 62—23

FOREIGN PATENTS 930,682  10/1963  Great Britain.

NORMAN YUDKOFF, *Primary Examiner.*

V. W. PRETKA, *Assistant Examiner.*